(12) United States Patent
Miyata

(10) Patent No.: US 9,144,024 B2
(45) Date of Patent: Sep. 22, 2015

(54) WIRELESS BASE STATION, WIRELESS COMMUNICATION SYSTEM, AND WIRELESS COMMUNICATION METHOD

(75) Inventor: Takeo Miyata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 50 days.

(21) Appl. No.: 13/700,072

(22) PCT Filed: May 26, 2011

(86) PCT No.: PCT/JP2011/062113
§ 371 (c)(1),
(2), (4) Date: Nov. 26, 2012

(87) PCT Pub. No.: WO2011/149024
PCT Pub. Date: Dec. 1, 2011

(65) Prior Publication Data
US 2013/0070735 A1 Mar. 21, 2013

(30) Foreign Application Priority Data
May 27, 2010 (JP) .................................. 2010-121889

(51) Int. Cl.
*H04J 3/00* (2006.01)
*H04W 52/02* (2009.01)
(Continued)

(52) U.S. Cl.
CPC ........ *H04W 52/0258* (2013.01); *H04W 52/244* (2013.01); *H04W 52/325* (2013.01); *H04W 52/0229* (2013.01); *H04W 52/143* (2013.01); *H04W 52/386* (2013.01); *Y02B 60/50* (2013.01)

(58) Field of Classification Search
CPC ............ H04W 72/0446; H04W 72/04; H04W 56/001; H04W 52/146; H04W 52/243; H04W 52/367; H04W 52/04; H04W 36/30; H04W 36/14; H04W 24/10; H04W 88/06; H04W 36/08; H04L 5/0037; H04L 5/0078; H04L 1/06; H04L 5/0023; H04B 7/0413; H04B 7/0456; H04B 7/0689; Y02B 60/50

USPC ......... 370/336, 295, 329; 375/260; 455/452.2
See application file for complete search history.

(56) References Cited

U.S. PATENT DOCUMENTS 8,285,293 B2 * 10/2012 Claussen et al. .............. 455/446
2008/0014958 A1 * 1/2008 Kim et al. ................... 455/452.2
(Continued)

FOREIGN PATENT DOCUMENTS

JP 2010-056653 A 3/2010
WO 2009/064699 A1 5/2009
(Continued)

OTHER PUBLICATIONS

International Search Report issued by Japan Patent Office for International Application No. PCT/JP2011/062113.
(Continued)

*Primary Examiner* — Andrew Chriss
*Assistant Examiner* — Atique Ahmed
(74) *Attorney, Agent, or Firm* — Procopio, Cory, Hargreaves & Savitch LLP

(57) ABSTRACT

When time at present is included in a high-traffic time period, an interference determining unit (37) determines that there is a possibility that a downlink signal to be received by any wireless terminal has interference with a pilot signal transmitted from a wireless base station. A pilot signal transmission control unit (40) controls the transmission of the pilot signal, which is included in an OFDMA frame or an OFDM frame. When it is determined that there is the possibility of interference, the pilot signal transmission control unit (40) stops the transmission of the pilot signal or reduces power of the pilot signal in a whole or a portion of a user data area.

7 Claims, 18 Drawing Sheets

(51) Int. Cl.
*H04W 52/24* (2009.01)
*H04W 52/32* (2009.01)
*H04W 52/14* (2009.01)
*H04W 52/38* (2009.01)

(56) References Cited

U.S. PATENT DOCUMENTS

| | | | |
|---|---|---|---|
| 2008/0051147 A1* | 2/2008 | Kwun et al. | 455/561 |
| 2009/0130980 A1 | 5/2009 | Palanki et al. | |
| 2009/0197631 A1 | 8/2009 | Palanki et al. | |
| 2009/0219852 A1* | 9/2009 | Youn et al. | 370/315 |
| 2009/0247181 A1 | 10/2009 | Palanki et al. | |
| 2009/0252099 A1 | 10/2009 | Black et al. | |
| 2009/0286562 A1* | 11/2009 | Gorokhov | 455/501 |
| 2010/0008315 A1* | 1/2010 | Palanki et al. | 370/329 |
| 2010/0039948 A1 | 2/2010 | Agrawal et al. | |
| 2010/0142636 A1* | 6/2010 | Heath et al. | 375/260 |
| 2010/0278063 A1* | 11/2010 | Kim et al. | 370/252 |
| 2010/0329220 A1* | 12/2010 | Kim et al. | 370/336 |
| 2011/0116570 A1* | 5/2011 | Kim et al. | 375/295 |

FOREIGN PATENT DOCUMENTS

| | | |
|---|---|---|
| WO | 2009/070610 A2 | 6/2009 |
| WO | 2009/099813 A1 | 8/2009 |
| WO | 2009/120478 A2 | 10/2009 |
| WO | 2009/122781 A1 | 10/2009 |
| WO | 2009/157723 A2 | 12/2009 |

OTHER PUBLICATIONS

Office Action dated Sep. 30, 2014 issued in corresponding Chinese patent application No. 201180025942.X.

* cited by examiner

FIG.7

| LEVEL | MIMO SCHEME | MCS | DATA TRANSFER RATE(bit/sym) |
|---|---|---|---|
| A1 | MATRIX-A | QPSK 1/2 | 1 |
| A2 | MATRIX-A | QPSK 3/4 | 1.5 |
| A3 | MATRIX-A | 16QAM 1/2 | 2 |
| A4 | MATRIX-A | 16QAM 3/4 | 3 |
| A5 | MATRIX-A | 64QAM 1/2 | 3 |
| A6 | MATRIX-A | 64QAM 2/3 | 4 |
| A7 | MATRIX-A | 64QAM 3/4 | 4.5 |
| B1 | MATRIX-B | QPSK 1/2 | 2 |
| B2 | MATRIX-B | QPSK 3/4 | 3 |
| B3 | MATRIX-B | 16QAM 1/2 | 4 |
| B4 | MATRIX-B | 16QAM 3/4 | 6 |
| B5 | MATRIX-B | 64QAM 1/2 | 6 |
| B6 | MATRIX-B | 64QAM 2/3 | 8 |
| B7 | MATRIX-B | 64QAM 3/4 | 9 |

WIRELESS BASE STATION, WIRELESS COMMUNICATION SYSTEM, AND WIRELESS COMMUNICATION METHOD

TECHNICAL FIELD

The present invention relates to a wireless base station, a wireless communication system, and a wireless communication method, in particular, a technique for control of transmission of a pilot signal used for estimation and/or synchronization of a channel.

BACKGROUND ART

In a wireless communication system, a plurality of communication devices transmit signals having the same frequency or frequencies close to each other. This may result in interference between these signals, disadvantageously. Such interference leads to decreased throughput in the entire wireless system.

To address this, for example, PTL 1 (Japanese Patent Laying-Open No. 2010-56653) discloses a wireless relay device that relays a first wireless network and a second wireless network employing different frequency channels. This wireless relay device includes: a first interface unit corresponding to a terminal of the first wireless network; a second interface unit corresponding to a base station of the second wireless network; and a scheduler for setting a transmission/reception timing of the second wireless network in synchronization with a transmission/reception timing of the first wireless network, wherein the second interface unit provides a terminal of the second wireless network with a notification of a downlink transmission period and an uplink reception period of the second wireless network, which are determined by the scheduler, so as to control the transmission/reception timing of the second wireless network.

CITATION LIST

Patent Literature

PTL 1: Japanese Patent Laying-Open No. 2010-56653.

SUMMARY OF INVENTION

Technical Problem

However, PTL 1 (Japanese Patent Laying-Open No. 2010-56653) does not describe a configuration for preventing interference with a pilot signal. For example, in a WiMAX (Worldwide Interoperability for Microwave Access) communication system, a wireless base station always transmits a pilot signal for estimation and/or synchronization of channel. Even when the wireless base station is not communicating with a wireless terminal, the wireless base station keeps on transmitting the pilot signal.

Hence, in the case where two wireless base stations using the same frequency are located adjacent to each other, one of the wireless base stations is communicating with a wireless terminal, and the other wireless base station is not communicating with a wireless terminal, a signal from the wireless base station communicating with the wireless terminal may have interference with a pilot signal transmitted from the wireless base station not communicating with the wireless terminal.

In view of this, an object of the present invention is to provide a wireless base station, a wireless communication system, and a wireless communication method, by each of which interference by a pilot signal can be prevented.

Solution to Problem

To solve the above-described problem, the present invention provides a wireless base station that communicates with a wireless terminal, including: a determining unit for determining that there is a possibility that a downlink signal to be received by any wireless terminal has interference with a pilot signal transmitted from the wireless base station, when time at present is included in a high-traffic time period; and a pilot signal transmission control unit for controlling the transmission of the pilot signal, when the determining unit determines that there is the possibility of interference, the pilot signal transmission control unit stopping the transmission of the pilot signal or reducing power of the pilot signal in a whole or a portion of a user data area.

Advantageous Effects of Invention

According to the present invention, interference by a pilot signal can be prevented.

Each of FIGS. 6(a) and (b) shows exemplary transmission of a pilot signal.

FIG. 7 shows exemplary communication levels of a downlink signal.

Figure 8:
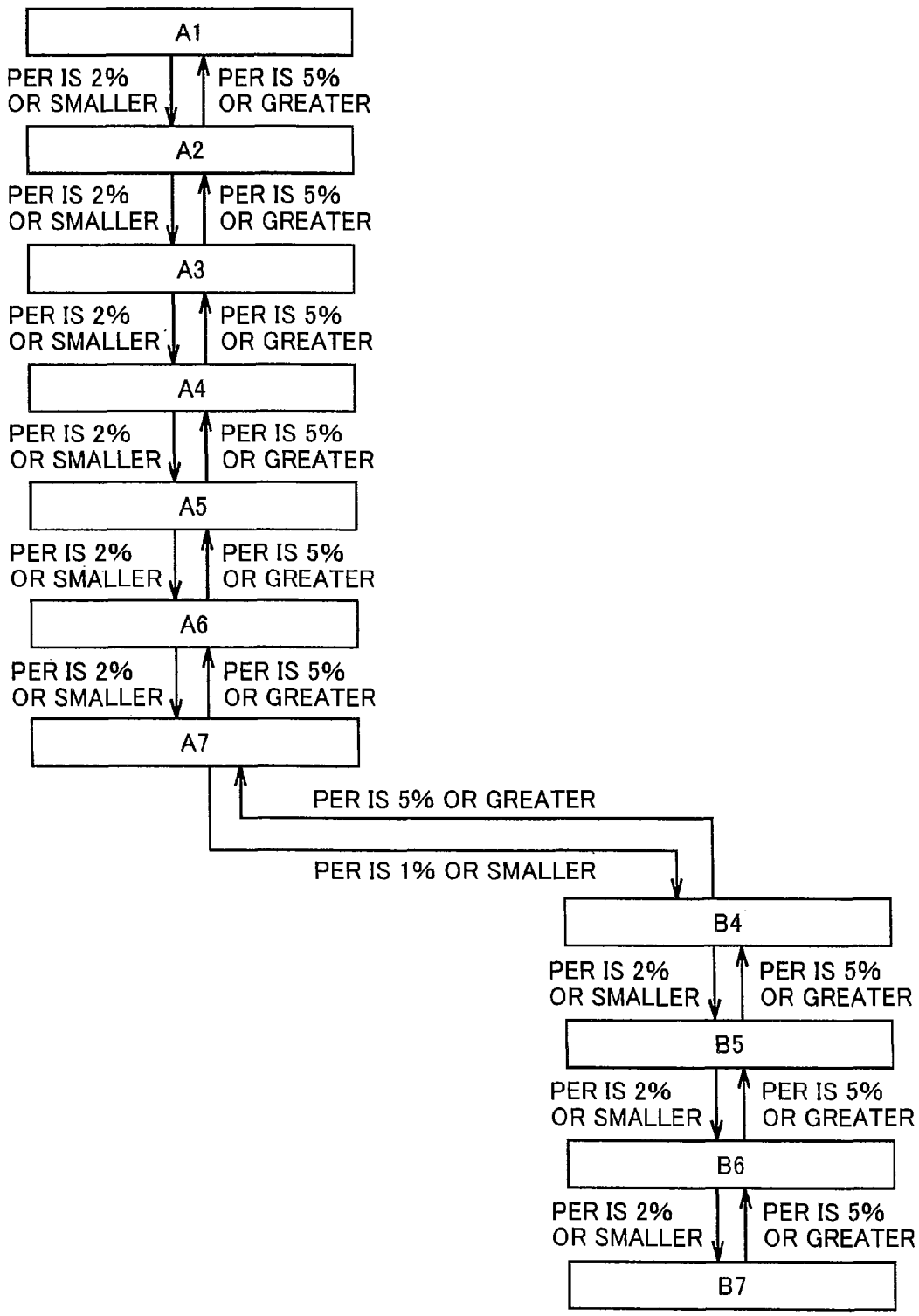

FIG. 8 shows a rule of switching the communication level of the downlink signal in accordance with a first switching table.

Figure 9:
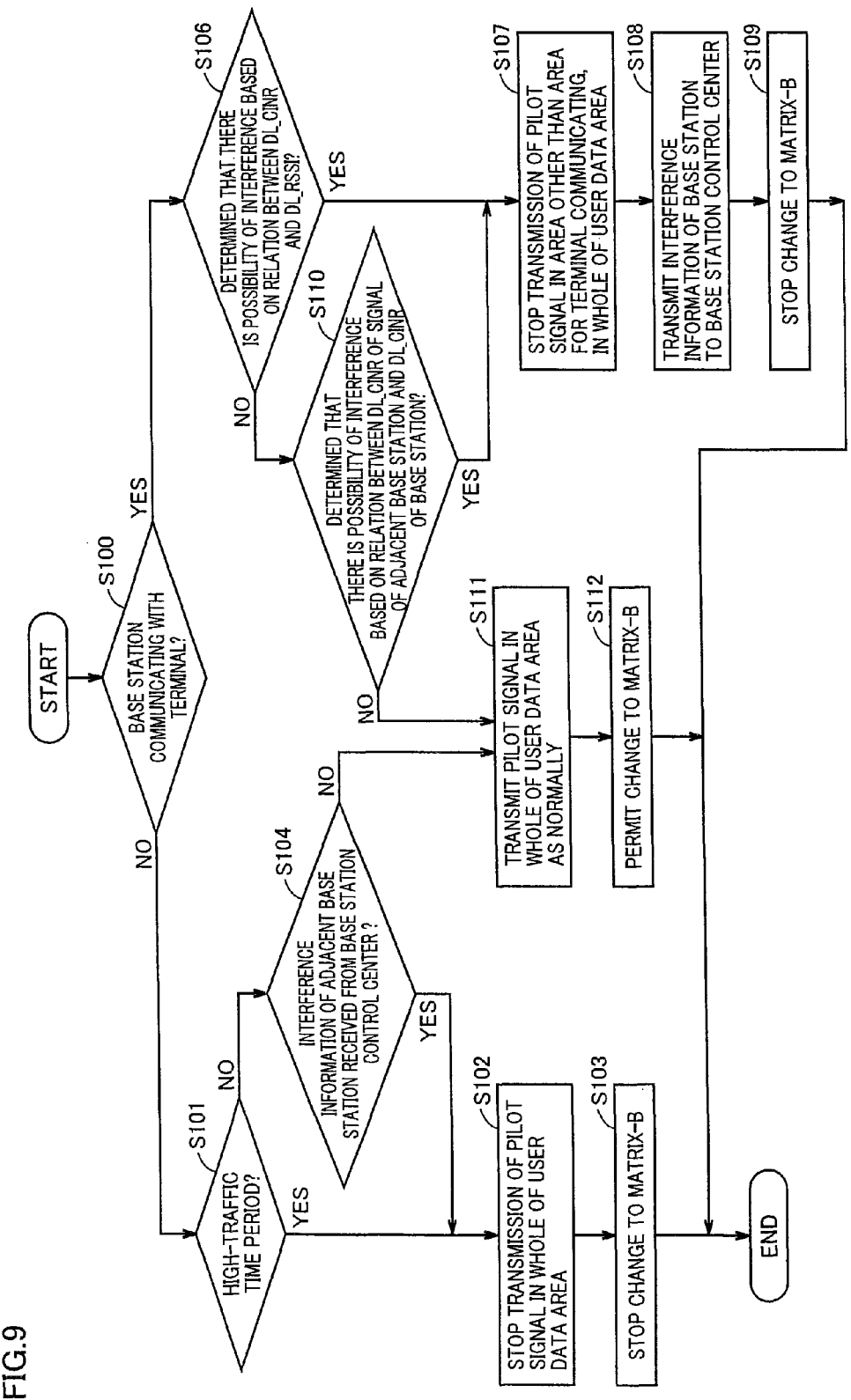

FIG. 9 is a flowchart showing a procedure of an operation for control of transmission of the pilot signal and for control of switching of the communication level in the first embodiment.

Figure 10:
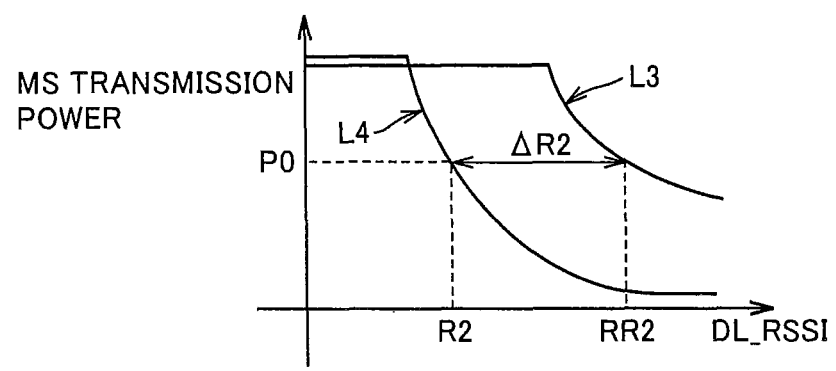

FIG. 10 is a graph showing a relation between transmission power of the wireless terminal communicating with the wireless base station and a carrier to interference and noise ratio (DL_CINR) of the downlink signal transmitted from the wireless base station, the DL_CINR being measured by the wireless terminal communicating therewith.

Figure 11:
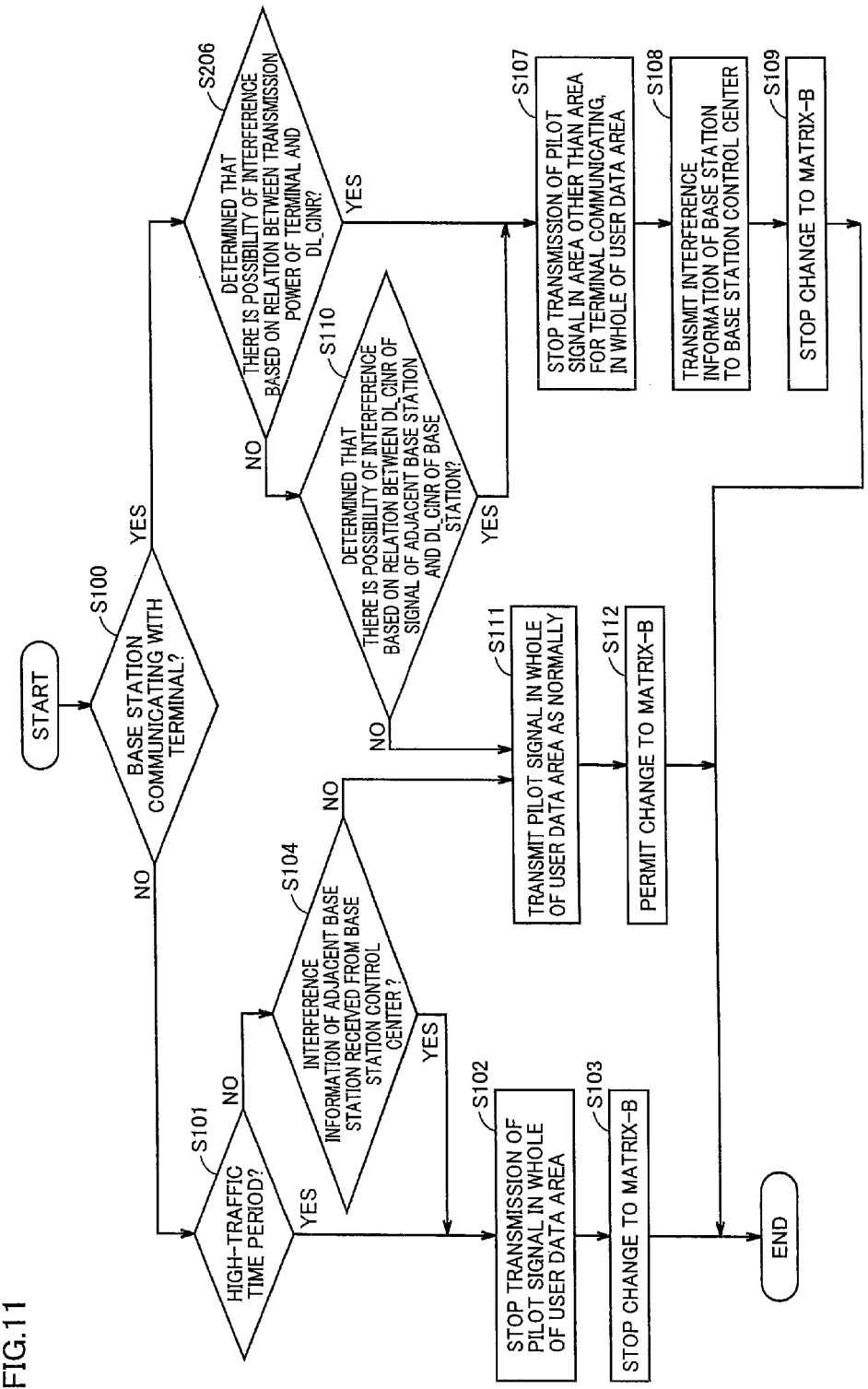

FIG. 11 is a flowchart showing a procedure of an operation for control of transmission of the pilot signal and for control of switching of the communication level in a wireless base station of a second embodiment.

Figure 12:
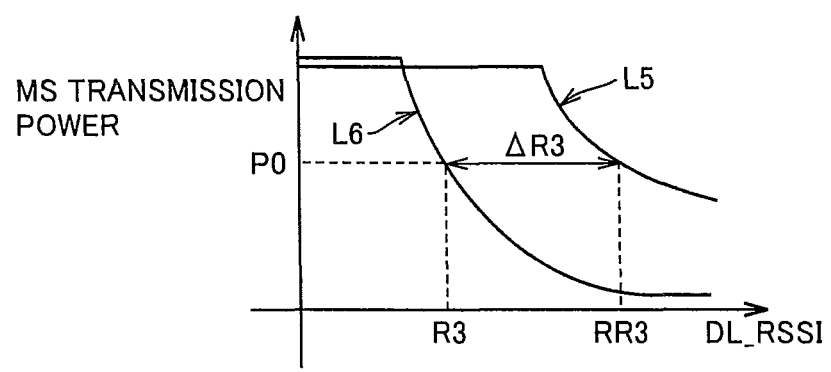

FIG. 12 is a graph showing a relation between transmission power of the wireless terminal communicating with the wireless base station and a receive signal strength indicator (DL_RSSI) of a downlink signal transmitted from the wireless base station, the DL_RSSI being measured by the wireless terminal communicating therewith.

Figure 13:
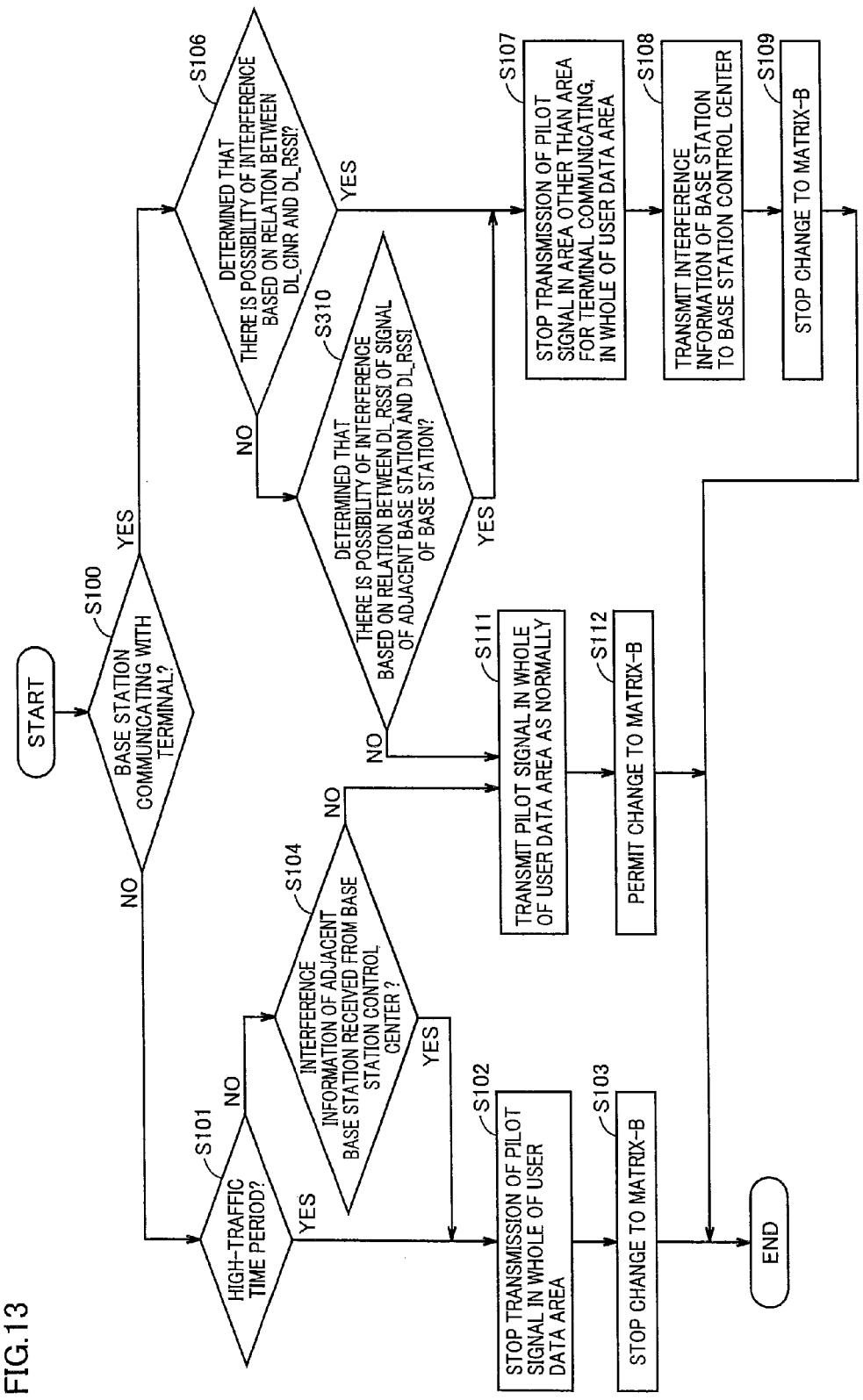

FIG. 13 is a flowchart showing a procedure of an operation for control of transmission of the pilot signal and for control of switching of the communication level in a wireless base station of a third embodiment.

Figure 14:
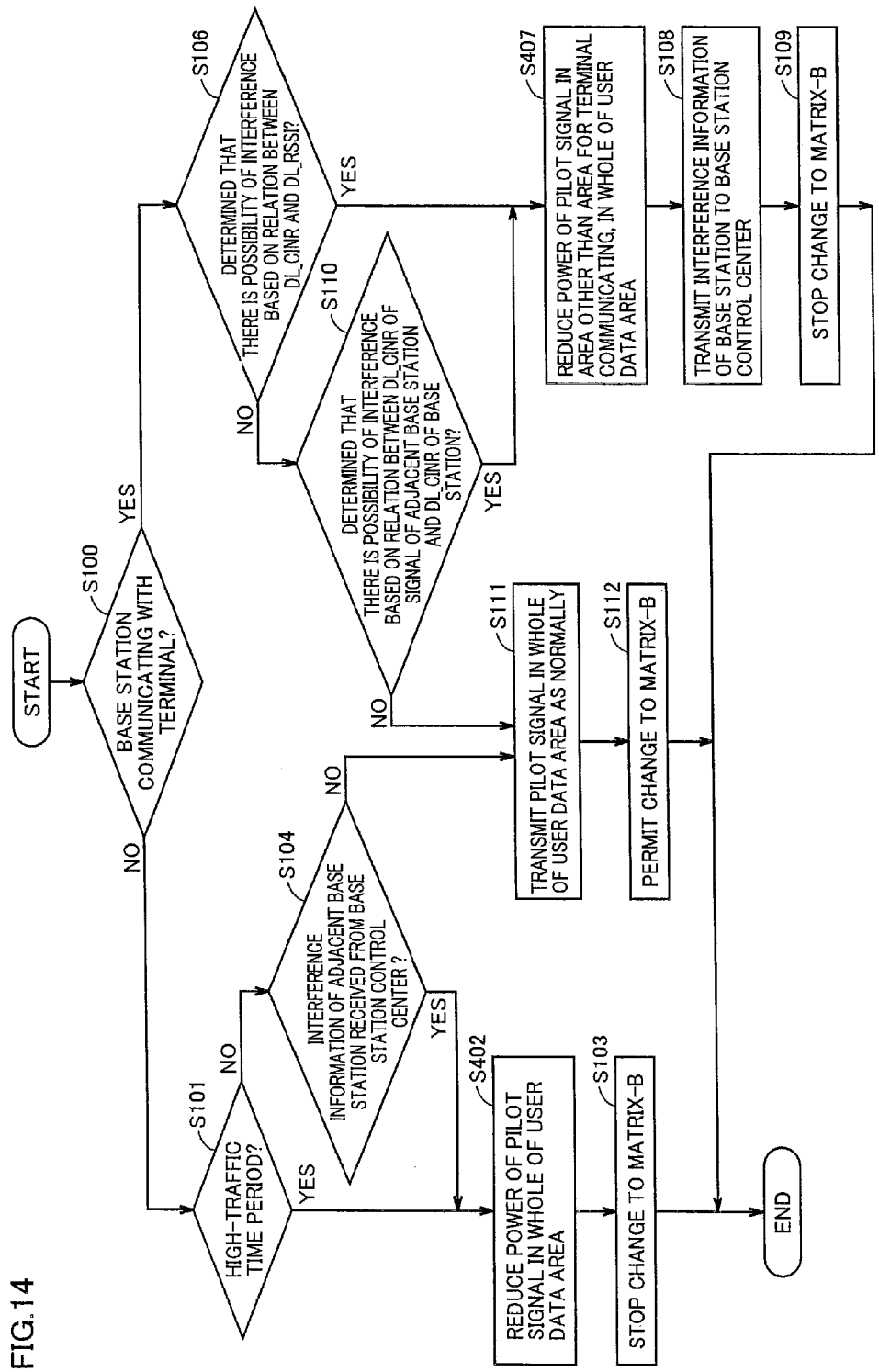

FIG. 14 is a flowchart showing a procedure of an operation for control of transmission of the pilot signal and for control of switching of the communication level in a wireless base station of a fourth embodiment.

Figure 15:
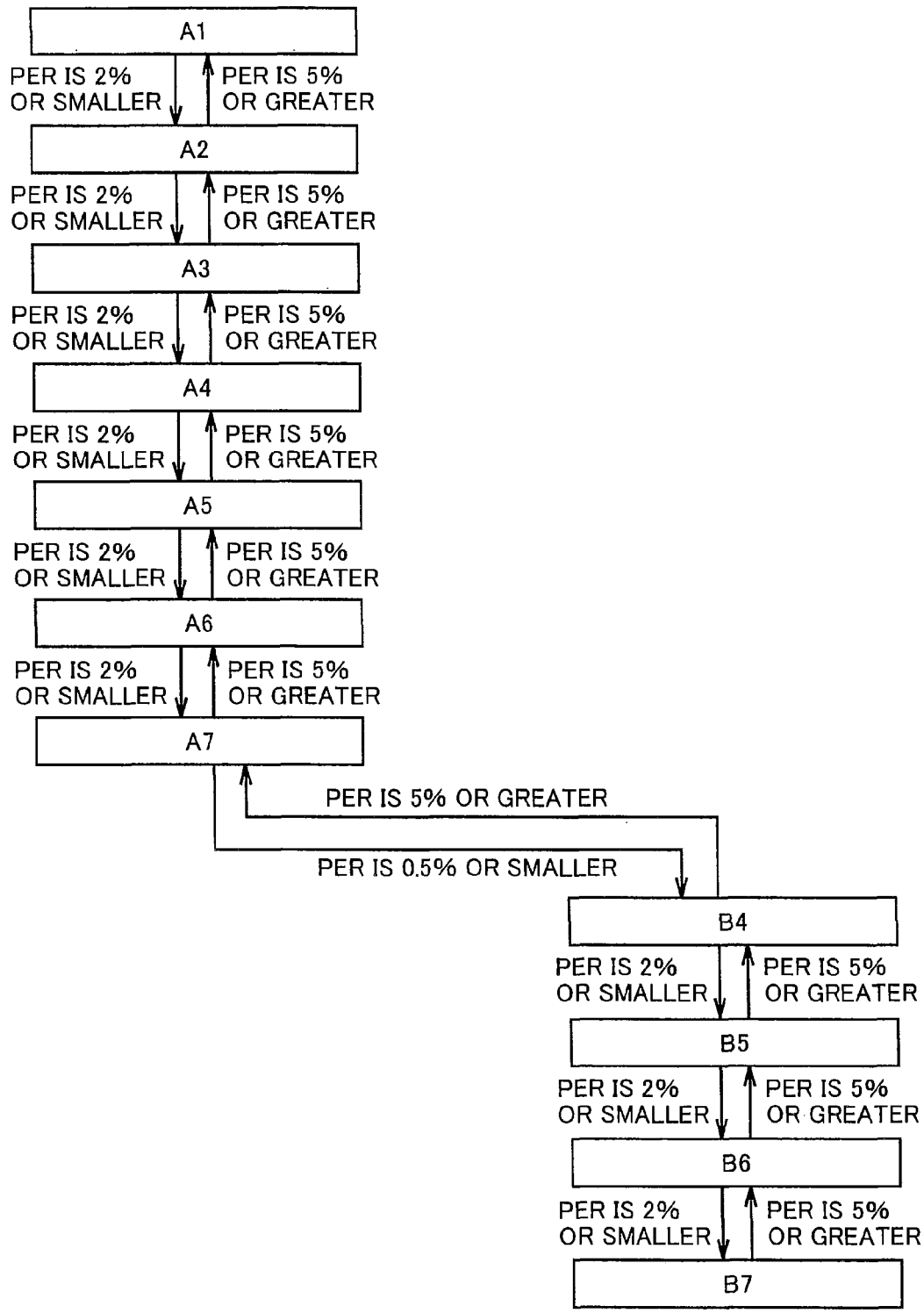

FIG. 15 shows a rule of switching the communication level in accordance with the second switching table.

Figure 16:
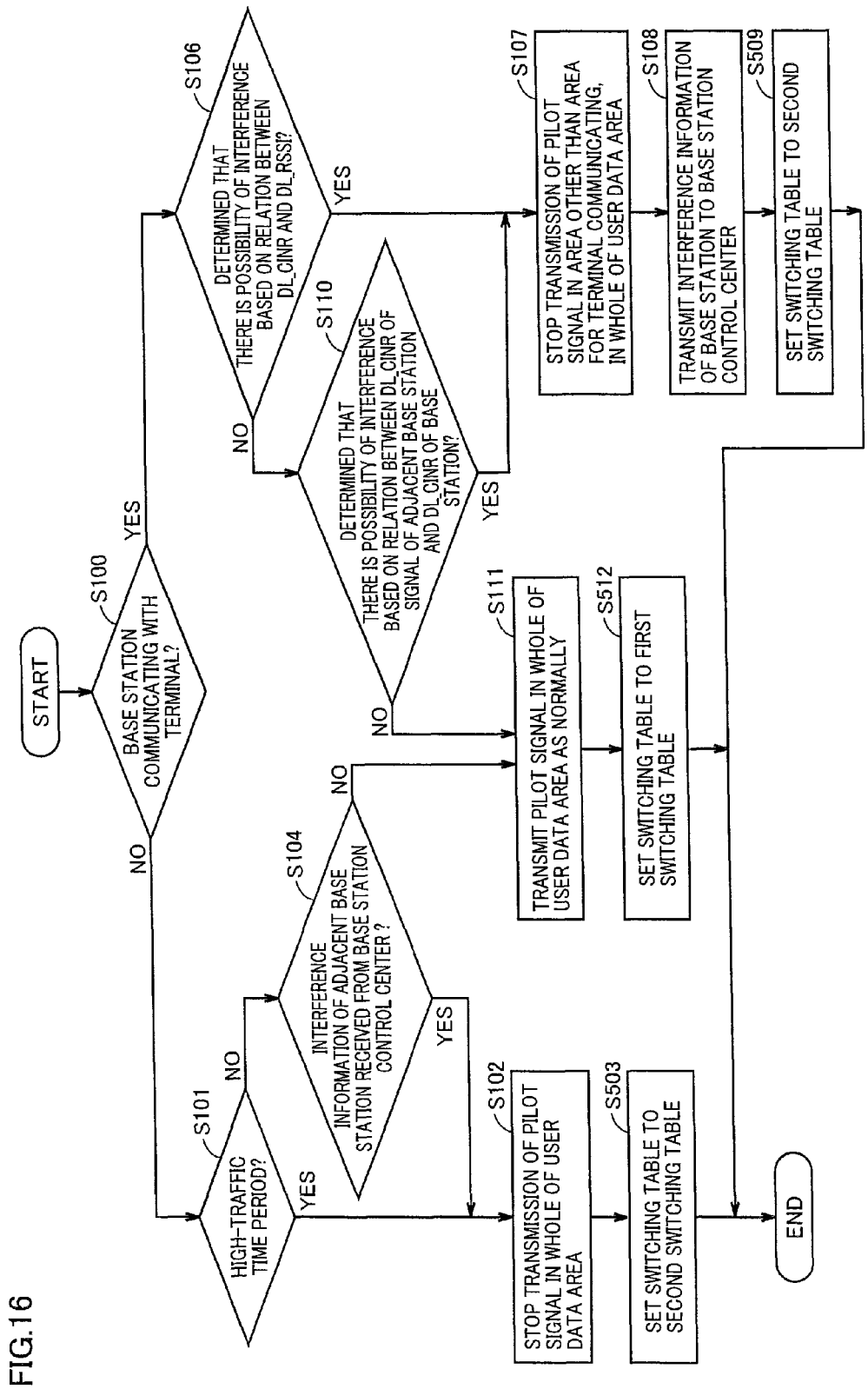

FIG. 16 is a flowchart showing a procedure of an operation for control of transmission of the pilot signal and for control of switching of the communication level in a wireless base station of a fifth embodiment.

FIGS. 17(a)-(c) show respective exemplary pilot transmission areas set for and used for wireless base stations A, B, C.

Figure 18:
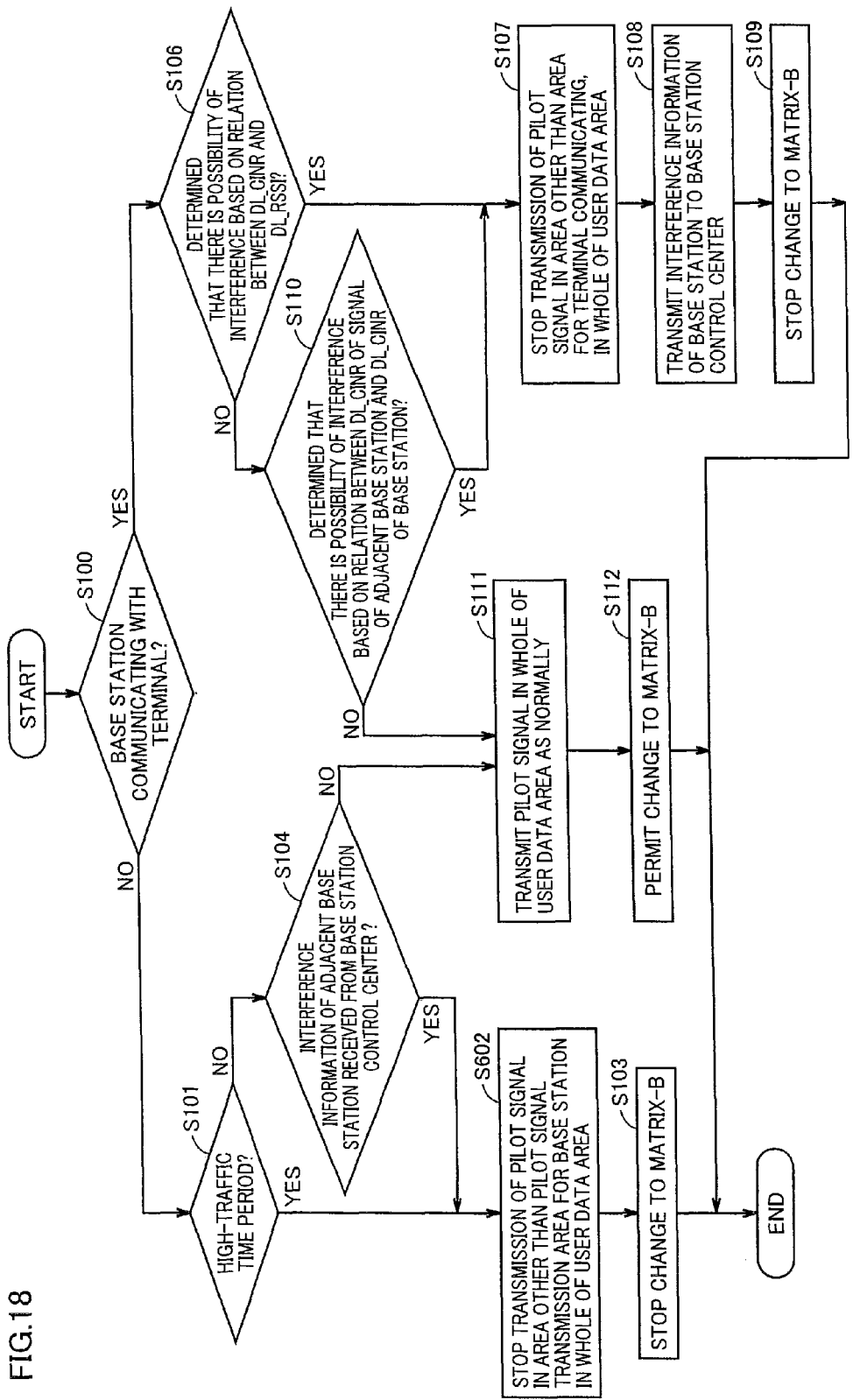

FIG. 18 is a flowchart showing a procedure of an operation for control of transmission of the pilot signal and for control of switching of the communication level in a wireless base station of a sixth embodiment.

DESCRIPTION OF EMBODIMENTS

The following describes embodiments of the present invention with reference to figures.

First Embodiment

Configuration of Wireless Communication System

Figure 1:
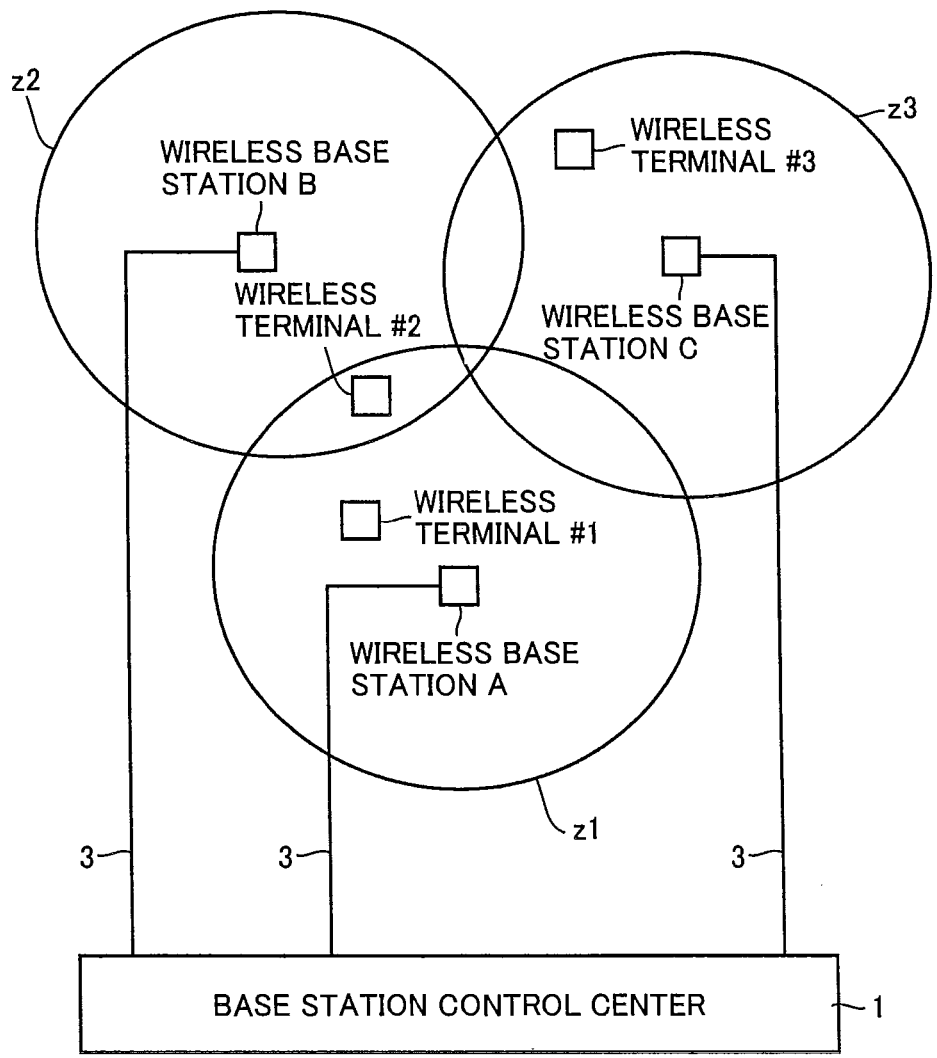
FIG. 1 shows a configuration of a wireless communication system of an embodiment of the present invention.

FIG. 1 shows a configuration of a wireless communication system of an embodiment of the present invention.

Referring to FIG. 1, wireless base stations A-C are arranged. Here, zones z1, z2, z3 respectively represent ranges in which electric waves are delivered from wireless base stations A, B, C. Zone z1 of wireless base station A overlaps with zones z2, z3 of the other wireless base stations B, C. Hence, for example, when a wireless terminal #2 is communicating with wireless base station A, a signal received by wireless terminal #2 from wireless base station A has interference with a signal from wireless base station B. Wireless base stations A-C are connected to base station control center 1 via network cables 3.

(Configuration of Wireless Base Station)

Figure 2:
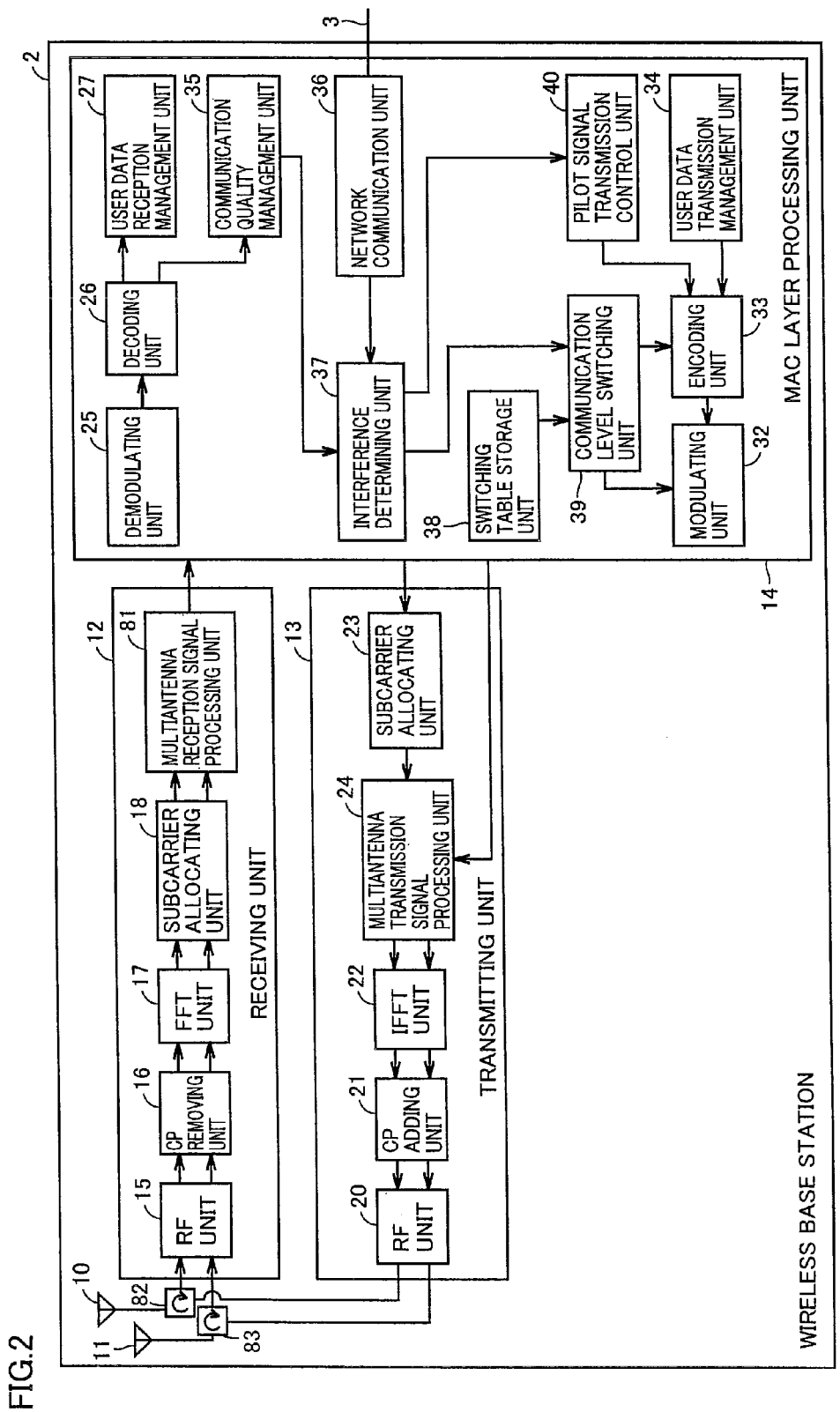
FIG. 2 shows a configuration of a wireless base station of the embodiment of the present invention.

FIG. 2 shows a wireless base station of the embodiment of the present invention.

Referring to FIG. 2, this wireless base station 2 includes a first antenna 10, a second antenna 11, a transmitting unit 13, a receiving unit 12, a MAC (Media Access Control) layer processing unit 14, a first coupler/distributor 82, and a second coupler/distributor 83.

First coupler/distributor 82 is constituted of a circulator, for example. First coupler/distributor 82 receives a signal from transmitting unit 13 and sends it to first antenna 10, and receives a signal from first antenna 10 and sends it to receiving unit 12.

Second coupler/distributor 83 is constituted of a circulator, for example. Second coupler/distributor 83 receives a signal from transmitting unit 13 and sends it to second antenna 11, and receives a signal from second antenna 11 and sends it to receiving unit 12.

Transmitting unit 13 includes a multiantenna transmission signal processing unit 24, a subcarrier allocating unit 23, an IFFT unit (Inverse First Fourier Transform) 22, a CP (Cyclic Prefix) adding unit 21, and an RF (Radio Frequency) unit 20.

Subcarrier allocating unit 23 allocates a subcarrier based on PUSC (Partial Usage of Subchannels), for example.

When a MIMO communication scheme is set to be MATRIX-A, multiantenna transmission signal processing unit 24 performs space-time coding (for example, Alamouti-coding) of one data stream. When the MIMO communication scheme is set to be MATRIX-B, multiantenna transmission signal processing unit 24 spatially multiplexes a plurality of data streams.

IFFT unit 22 employs IFFT to convert a plurality of subcarrier signals (frequency domain signals), which are sent from multiantenna transmission signal processing unit 24, into a time domain signal (OFDMA (Orthogonal Frequency Division Multiple Access) symbol).

CP adding unit 21 adds a signal to the head of an OFDMA symbol as a CP. The signal thus added is the same as that for the tail portion of the OFDMA symbol.

RF unit 20 includes: an up-converter for performing up-conversion to a radio frequency band; a power amplification circuit for amplifying the up-converted signal; a band pass filter permitting passage of only a signal component of desired band in the amplified signal to first antenna 10 and second antenna 11; and the like.

Receiving unit 12 includes an RF unit 15, a CP removing unit 16, an FFT unit 17, a subcarrier allocating unit 18, and a multiantenna reception signal processing unit 81.

RF unit 15 includes: a band pass filter permitting passage of only a signal component of desired band in a signal sent from each of first antenna 10 and second antenna 11; a low-noise amplification circuit for amplifying an RF signal; a down-converter for down-converting the RF signal; and the like.

CP removing unit 16 removes a CP from the signal sent from RF unit 15.

FFT unit 17 employs FFT to convert the time domain signal, which is sent from CP removing unit 16, into frequency domain signals, thereby achieving demodulation to a plurality of subcarriers.

Based on a PUSC, subcarrier allocating unit 18 extracts each subcarrier sent from FFT unit 17, for example.

Multiantenna reception signal processing unit 81 performs an adaptive array receiving process to the signal sent from subcarrier allocating unit 18, for example.

MAC layer processing unit 14 includes a user data transmission management unit 34, an encoding unit 33, a modulating unit 32, a demodulating unit 25, a decoding unit 26, and a user data reception management unit 27.

User data transmission management unit 34 manages user data to be transmitted to a wireless terminal 3.

Encoding unit 33 encodes an encoded downlink signal in accordance with an encoding rate of MCS (Modulation and Code Scheme) instructed by communication level switching unit 39.

Modulating unit 32 modulates the downlink signal to be transmitted to wireless terminal 3, in accordance with a modulation scheme of the MCS instructed by communication level switching unit 39.

Demodulating unit 25 demodulates an uplink signal sent from wireless terminal 3.

Decoding unit 26 decodes the demodulated uplink signal.

User data reception management unit 27 manages user data received from wireless ten Anal 3.

Further, MAC layer processing unit 14 includes a communication quality management unit 35, a network communication unit 36, a switching table storage unit 38, a communication level switching unit 39, a pilot signal transmission control unit 40, and an interference determining unit 37.

From base station control center 1, network communication unit 36 receives interference information indicating that a downlink signal from an adjacent wireless base station, which is located adjacent to the wireless base station, has interference.

Further, network communication unit 36 transmits, to base station control center 1, interference information indicating that a downlink signal of the wireless base station has interference.

Figure 3:
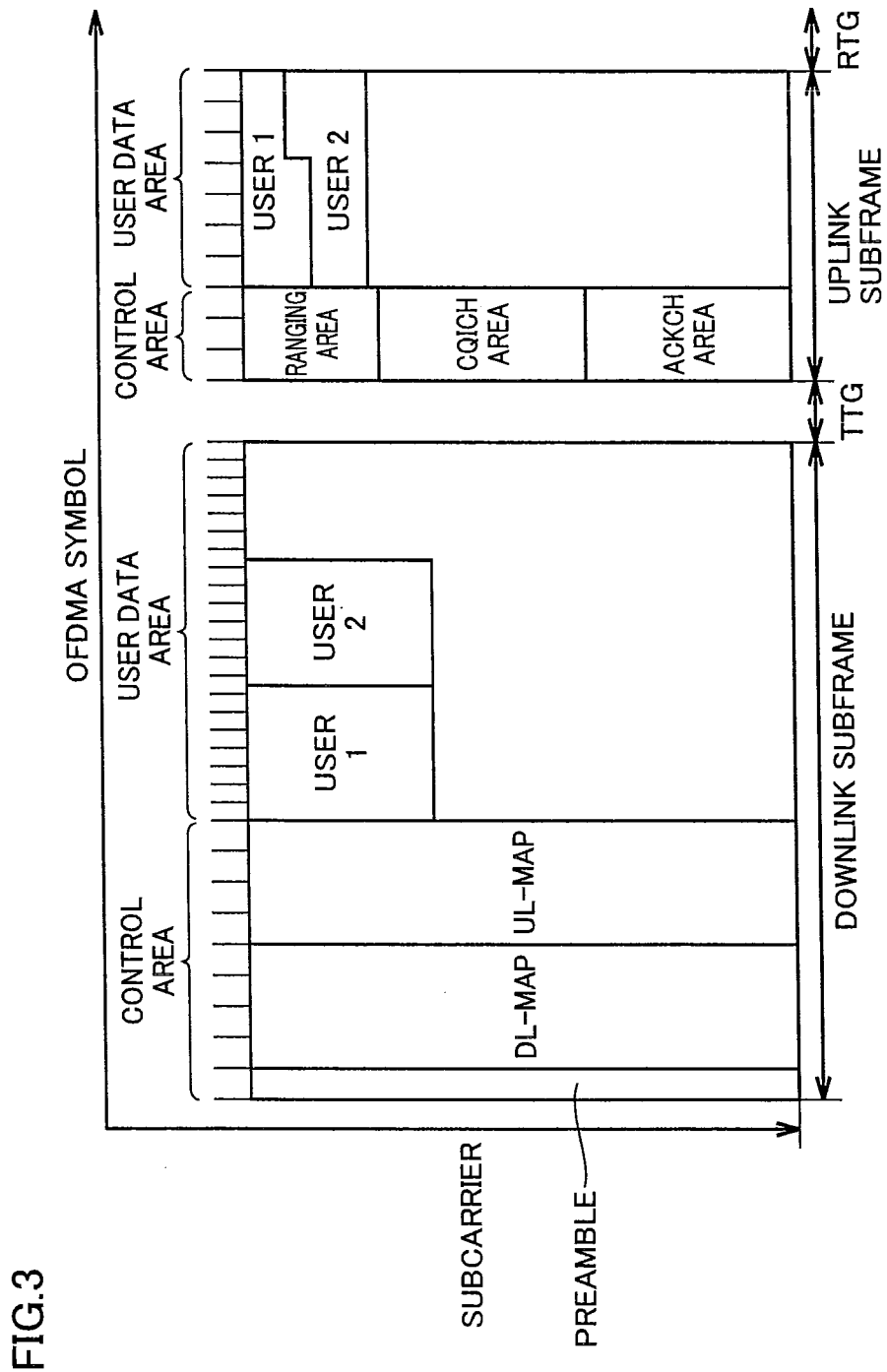
FIG. 3 shows a configuration of an OFDMA frame in the embodiment of the present invention.

FIG. 3 shows a configuration of an OFDMA frame.

Referring to FIG. 3, the OFDMA frame is made up of a downlink subframe and an uplink subframe.

The downlink subframe includes a control area and a user data area. The control area includes a preamble, a DL-MAP, and a UL-MAP.

To the preamble, a known signal is allocated to establish synchronization or the like. To the DL-MAP (Downlink Map), allocation information for downlink wireless resource is allocated. Allocated to the DL-MAP is, for example, information associated with a burst area of downlink user data, a transmission cycle (ranging cycle) of a ranging signal, a MCS for the downlink user data, a status of rate in the wireless terminal, or the like. To the UL-MAP (Uplink Map), allocation information for uplink wireless resource is allocated. Allocated to the UL-MAP is, for example, information such as a burst area of uplink user data, or an MCS for the uplink user data.

To the user data area, downlink user data is allocated.

The uplink subframe includes a control area and a user data area. The control area includes a ranging area, a CQICH area, and an ACKCH area.

To the ranging area, a ranging signal is allocated. To the CQICH (channel quality information channel) area, a signal indicating channel quality is allocated. To the ACKCH (Acknowledgement Channel) area, a signal indicating channel acknowledgement is allocated.

To the user data area, uplink user data is allocated.

From the wireless terminal communicating with the wireless base station, communication quality management unit 35 is notified of a carrier to interference and noise ratio (DL_CINR) and a receive signal strength indicator (DL_RSSI) of the downlink signal transmitted from the wireless base station, using the CQICH of the uplink subframe. The DL_CINR and the DL_RSSI are measured by the wireless terminal communicating therewith. Communication quality management unit 35 stores the DL_CINR and the DL_RSSI thus notified.

When time at present is included in a high-traffic time period, interference determining unit 37 determines that there is a possibility that a downlink signal to be received by any wireless terminal in the zone of the wireless base station has interference with a pilot signal transmitted from the wireless base station.

Further, when network communication unit 36 receives interference information indicating that a downlink signal from an adjacent wireless base station, which is located adjacent to the wireless base station, has interference, interference determining unit 37 determines that there is a possibility that a downlink signal to be received by any wireless terminal in the zone of the wireless base station has interference with the pilot signal transmitted from the wireless base station.

Figure 4:
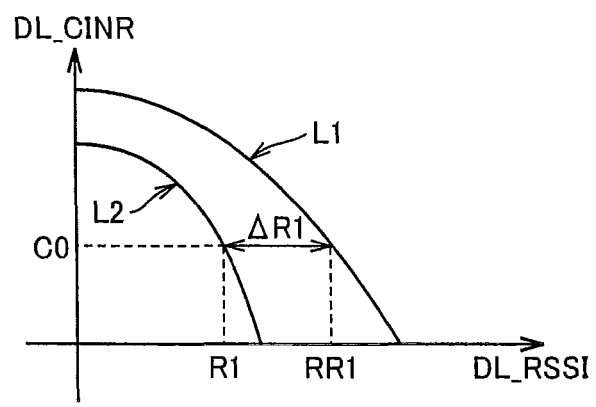
FIG. 4 is a graph showing a relation between a carrier to interference and noise ratio (DL_CINR) and a receive signal strength indicator (DL_RSSI) of the downlink signal transmitted from the wireless base station, the DL_CINR and DL_RSSI being measured by the wireless terminal communicating therewith.

FIG. 4 is a graph showing a relation between the carrier to interference and noise ratio (DL_CINR) and the receive signal strength indicator (DL_RSSI) of the downlink signal transmitted from the wireless base station, the DL_CINR and the DL_RSSI being measured by the wireless terminal communicating therewith.

In FIG. 4, L1 is a curve when there is no interference. L2 is an exemplary curve when there is interference.

Interference determining unit 37 stores the relation provided by the curve of L1 in advance, in the form of a table or a mathematical expression. Interference determining unit 37 calculates a normal value RR1 of the DL_RSSI, which is obtained in the case where there is no interference and corresponds to a value C0 of the DL_CINR received from the wireless terminal communicating with the wireless base station. The calculation is performed in accordance with the previously stored table or mathematical expression. Interference determining unit 37 calculates a difference $\Delta R1$ between this normal value RR1 and a value R1 of the DL_RSSI received from the wireless terminal. When difference $\Delta R1$ is equal to or greater than a predetermined threshold value, interference determining unit 37 determines that the downlink signal transmitted to the wireless terminal communicating with the wireless base station has interference. Further, in this case, interference determining unit 37 determines that there is a possibility that a downlink signal to be received by any wireless terminal in the zone of the wireless base station has interference with the pilot signal transmitted from the wireless base station. This is due to the following reason. That is, when the downlink signal transmitted to the wireless terminal communicating with the wireless base station has interference, traffic is high. Hence, it is considered that there is a possibility that the pilot signal transmitted from the wireless base station also interferes with other desired signal.

Further, interference determining unit 37 calculates a threshold value by subtracting a predetermined value from the wireless base station's DL_CINR, which is received from the wireless terminal communicating with the wireless base station. Interference determining unit 37 determines that when the adjacent base station's DL_CINR received from the wireless terminal is equal to or greater than this threshold value, the downlink signal transmitted to the wireless terminal communicating with the wireless base station has interference. Further, in this case, interference determining unit 37 determines that there is a possibility that a downlink signal to be received by any wireless terminal in the zone of the wireless base station has interference with the pilot signal transmitted from the wireless base station. This is due to the following reason. That is, when the DL_CINR of the downlink signal from the adjacent wireless base station is large, traffic is high. Hence, it is considered that there is a possibility that the pilot signal transmitted from the wireless base station also interferes with other desired signal.

Pilot signal transmission control unit 40 controls transmission of the pilot signal included in the user data area of the downlink subframe of the OFDMA.

Figure 5:
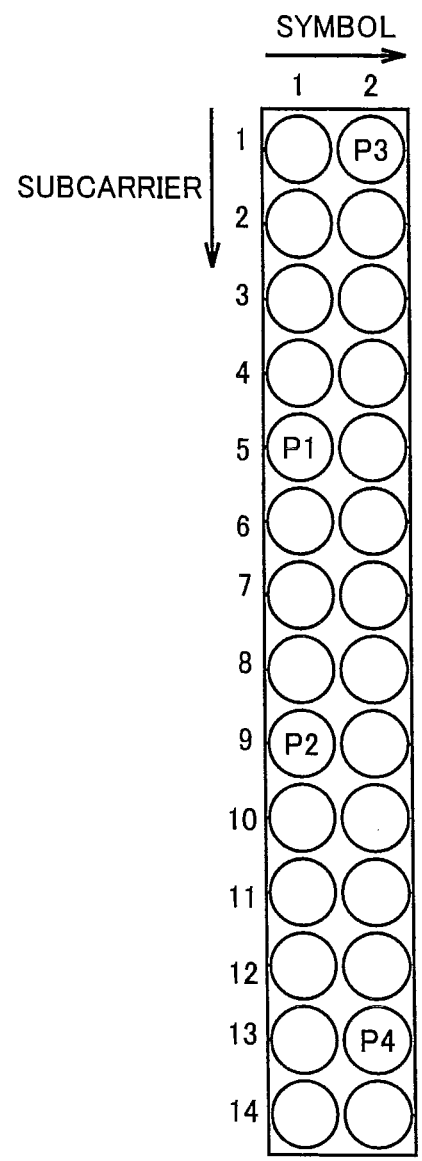
FIG. 5 shows a configuration of a PUSC cluster.

The user data area of the downlink subframe is normally configured based on a PUSC cluster as a unit as shown in FIG. 5. As shown in FIG. 5, one PUSC cluster is constituted of two symbols and fourteen subcarriers. A pilot signal is transmitted with two subcarriers per symbol.

Figure 6:
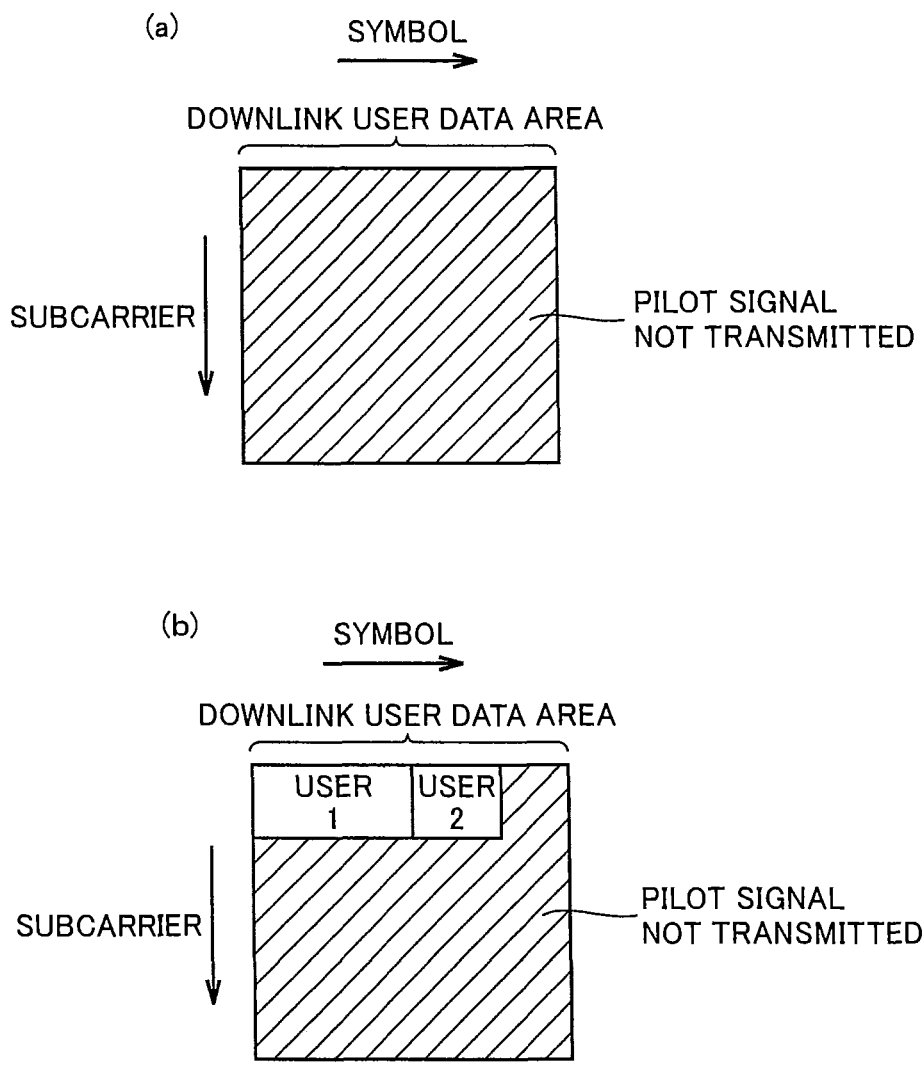

Each of FIG. 6(*a*) and FIG. 6(*b*) shows exemplary transmission of the pilot signal. FIG. 6(*a*) and FIG. 6(*b*) show a whole of the downlink user data area. The horizontal axis represents the symbols, whereas the vertical axis represents the subcarriers.

When interference determining unit 37 determines that there is a possibility of interference and when there is no wireless terminal communicating with the wireless base station, pilot signal transmission control unit 40 stops transmission of the pilot signal in the whole of the user data area. Pilot signal transmission control unit 40 does not transmit the pilot signal as shown in FIG. 6(*a*). In this case, all the clusters constituting the user data area of the downlink subframe do not include the pilot signal.

When interference determining unit 37 determines that there is a possibility of interference and when there is a wireless terminal communicating with the wireless base station, pilot signal transmission control unit 40 transmits the pilot signal only in the area for the wireless terminal communicating therewith, in the whole of the user data area. Pilot signal transmission control unit 40 transmits the pilot signal only in the area for the wireless terminal communicating with the wireless base station as shown in FIG. 6(b). In this case, all the clusters constituting an area other than an area for the wireless terminal communicating therewith in the user data area of the downlink subframe do not include the pilot signal. Further, in this case, the wireless base station sets "dedicated pilot on" in the DL_MAP so as to indicate that the wireless terminal will use the pilot signal in the area for the wireless terminal.

Even if there is a possibility of interference, pilot signal transmission control unit 40 does not stop transmission of the pilot signal in the control area.

Communication level switching unit 39 manages a communication level of the downlink signal at present.

FIG. 7 shows exemplary communication levels of the downlink signal.

Referring to FIG. 7, a communication level table shows a relation among the communication level, a MIMO scheme, a MCS, and a data transfer rate.

For example, it is indicated that when the communication level is "A1", the MIMO scheme is "MATRIX-A", the MCS is "QPSK ½", and the data transfer rate is "1" (bit/symbol).

A change of the level from one of "A 1-A7" to one of "B1-B7", i.e., a change of the MIMO scheme from MATRIX-A to MATRIX-B will be described as "MATRIX is leveled up" in the present specification. A change of the level from one of "B1-B7" to one of "A1-A7", i.e., a change of the MIMO scheme from MATRIX-B to MATRIX-A will be described as "MATRIX is leveled down" in the present specification. Further, a change of the MCS to an MCS with a higher data rate while the MIMO scheme is kept the same will be described as "MCS is leveled up" in the present specification. Meanwhile, a change to an MCS with a lower data rate will be described as "MCS is leveled down" in the present specification.

Switching table storage unit 38 stores a first switching table, which defines a rule of switching the communication level of the downlink signal.

In accordance with the first switching table of switching table storage unit 38, communication level switching unit 39 switches the communication level, i.e., switches the MIMO communication scheme and the MCS (the modulation scheme and the encoding rate) of the downlink signal.

FIG. 8 shows the rule of switching the communication level of the downlink signal in accordance with the first switching table.

Referring to FIG. 8, for example, in the case where a packet error rate PER for the downlink signal is "5%" or greater when the communication level at present is "A2", the communication level is leveled down to "A1". In other words, communication level switching unit 39 changes the MCS from "QPSK ¾" to "QPSK ½". Communication level switching unit 39 maintains the MIMO scheme at "MATRIX-A". Further, in the case where packet error rate PER for the downlink signal is "2%" or smaller when the communication level is "A2", the communication level is leveled up to "A3". In other words, communication level switching unit 39 changes the MCS from "QPSK ¾" to "16QAM ½". Communication level switching unit 39 maintains the MIMO scheme at "MATRIX-A". Further, in the case where packet error rate PER for the downlink signal is "1%" or smaller when the communication level at present is "A7", the communication level is leveled up to "B1". In other words, communication level switching unit 39 changes the MCS from "64QAM ¾" to "QPSK ½". Communication level switching unit 39 changes the MIMO scheme from "MATRIX-A" to "MATRIX-B".

When interference determining unit 37 determines that there is a possibility of interference, communication level switching unit 39 stops switching of the MIMO scheme from MATRIX-A to MATRIX-B, irrespective of packet error rate PER for the downlink signal. In other words, communication level switching unit 39 maintains the communication level at "A7" even in the case where packet error rate PER for the downlink signal becomes "1%" or smaller when the communication level at present is "A7".

(Operation)

FIG. 9 is a flowchart showing a procedure of an operation for control of transmission of the pilot signal and for control of switching of the communication level in the wireless base station of the first embodiment. The wireless base station performs the operation of the flowchart of FIG. 9 whenever a predetermined time elapses.

Referring to FIG. 9, first, when the wireless base station is communicating with no wireless terminal (NO in a step S100) and time at present is included in the high-traffic time period (YES in a step S101), interference determining unit 37 determines that there is a possibility that a downlink signal to be received by any wireless terminal in the zone of the wireless base station has interference with the pilot signal transmitted from the wireless base station. In this case, pilot signal transmission control unit 40 stops the transmission of the pilot signal in the whole of the user data area (a step S102). Further, communication level switching unit 39 stops switching to MATRIX-B irrespective of packet error rate PER for the downlink signal (a step S103).

Meanwhile, when the wireless base station is communicating with no wireless terminal (NO in step S100), time at present is not included in the high-traffic time period (NO in step S101), and interference information of an adjacent base station is received from base station control center 1 (YES in a step S104), interference determining unit 37 determines that there is a possibility that a downlink signal to be received by any wireless terminal in the zone of the wireless base station has interference with the pilot signal transmitted from the wireless base station. In this case, pilot signal transmission control unit 40 stops transmission of the pilot signal in the whole of the user data area (step S102). Further, communication level switching unit 39 stops switching to MATRIX-B irrespective of packet error rate PER for the downlink signal (step S103).

Meanwhile, when the wireless base station is communicating with any wireless terminal (YES in step S100), interference determining unit 37 calculates a normal value of the DL_RSSI corresponding to a value of the DL_CINR received from the wireless terminal communicating therewith. When a difference between this normal value and the value of the DL_RSSI received from the wireless terminal communicating therewith is equal to or greater than a predetermined threshold value (YES in a step S106), interference determining unit 37 determines that there is a possibility that a downlink signal to be received by any wireless terminal in the zone of the wireless base station has interference with the pilot signal transmitted from the wireless base station. In this case, pilot signal transmission control unit 40 stops transmission of the pilot signal in the area other than the area for the wireless terminal communicating with the wireless base station, in the whole of the user data area (a step S107). Further, network communication unit 36 transmits, to base station control center 1, interference information indicating that the downlink signal of the wireless base station has interference (a step S108). Further, communication level switching unit 39 stops switching to MATRIX-B irrespective of packet error rate PER for the downlink signal (a step S109).

Meanwhile, when the wireless base station is communicating with any wireless terminal (YES in step S100), interference determining unit 37 calculates a normal value corresponding to the DL_CINR received from the wireless terminal communicating therewith. When a difference between this normal value and the DL_RSSI received from the wireless terminal communicating therewith is lower than the predetermined threshold value (NO in step S106), interference determining unit 37 calculates a threshold value by subtracting a predetermined value from the wireless base station's DL_CINR received from the wireless terminal communicating therewith. When an adjacent base station's DL_CINR received from the wireless terminal communicating therewith is equal to or greater than this threshold value, interference determining unit 37 determines that there is a possibility that the downlink signal to be received by any wireless terminal in the zone of the wireless base station has interference with the pilot signal transmitted from the wireless base station. In this case, pilot signal transmission control unit 40 stops transmission of the pilot signal in the area other than the area for the wireless terminal communicating with the wireless base station, in the whole of the user data area (a step S107). Further, network communication unit 36 transmits, to base station control center 1, interference information indicating that the downlink signal of the wireless base station has interference (step S108). Further, communication level switching unit 39 stops switching to MATRIX-B irrespective of packet error rate PER for the downlink signal (a step S109).

Meanwhile, in the case where it is determined as NO in step S100, it is determined as NO in step S101, and it is determined as NO in step S104, or in the case where it is determined as YES in step S100, it is determined as NO in step S106, and it is determined as NO in step S110, interference determining unit 37 determines that there is no possibility that a downlink signal to be received by any wireless terminal in the zone of the wireless base station has interference with the pilot signal transmitted from the wireless base station. In this case, pilot signal transmission control unit 40 transmits the pilot signal in the whole of the user data area (a step S111). Further, communication level switching unit 39 performs switching to MATRIX-B based on packet error rate PER for the downlink signal (a step S112).

As described above, according to the first embodiment, in the case where there is a possibility that a downlink signal to be received by any wireless terminal in the zone of the wireless base station has interference with the pilot signal transmitted from the wireless base station, transmission of the pilot signal is stopped in the portion or the whole of the user data area. Hence, particularly in a communication system susceptible to the same frequency interference, deterioration resulting from the interference can be reduced, thereby improving frequency utilization efficiency in the entire system. Accordingly, throughput performance, area performance, and capacity performance can be improved.

Second Embodiment

An interference determining unit of a second embodiment is different from the interference determining unit of the first embodiment in terms of a method of determining whether or not there is interference.

FIG. 10 is a graph showing a relation between transmission power of the wireless terminal communicating with the wireless base station and a carrier to interference and noise ratio (DL_CINR) of a downlink signal transmitted from the wireless base station, the DL_CINR being measured by the wireless terminal communicating therewith.

In FIG. 10, L3 is a curve when there is no interference. L4 is an exemplary curve when there is interference.

Interference determining unit 37 stores the relation provided by the curve of L3 in advance, in the form of a table or a mathematical expression. Interference determining unit 37 calculates a normal value RR2 of the DL_CINR, which is obtained in the case where there is no interference and corresponds to a value P0 of the transmission power of the wireless terminal, which is received from the wireless terminal. The calculation is performed in accordance with the relation provided by the previously stored table or mathematical expression. Interference determining unit 37 calculates a difference ΔR2 between this normal value RR2 and a value R2 of the DL_CINR received from the wireless terminal. In the case where difference ΔR2 is equal to or greater than a predetermined threshold value, interference determining unit 37 determines that there is a possibility that a downlink signal to be received by any wireless terminal in the zone of the wireless base station has interference with the pilot signal transmitted from the wireless base station.

(Operation)

FIG. 11 is a flowchart showing a procedure of an operation for control of transmission of the pilot signal and control of switching of the communication level in the wireless base station of the second embodiment. The wireless base station performs the operation of the flowchart of FIG. 11 whenever a predetermined time elapses.

The flowchart of FIG. 11 is different from the flowchart of FIG. 9 in a step S206.

Specifically, when the wireless base station is communicating with any wireless terminal (YES in step S100), interference determining unit 37 calculates a normal value of the DL_CINR corresponding to the value of the transmission power of the wireless terminal communicating therewith, which is received from the wireless terminal. When a difference between this normal value and the value of the DL_CINR received from the wireless terminal communicating therewith is equal to or greater than a predetermined threshold value (YES in step S206), interference determining unit 37 determines that there is a possibility that a downlink signal to be received by any wireless terminal in the zone of the wireless base station has interference with the pilot signal transmitted from the wireless base station.

[Variation of Second Embodiment]

FIG. 12 is a graph showing a relation between transmission power of the wireless terminal communicating with the wireless base station and a receive signal strength indicator (DL_RSSI) of the downlink signal transmitted from the wireless base station, the DL_RSSI being measured by the wireless terminal communicating therewith.

In FIG. 12, L5 is a curve when there is no interference. L6 is an exemplary curve when there is interference.

Interference determining unit 37 stores the relation provided by the curve of L5 in advance, in the form of a table or a mathematical expression.

Interference determining unit 37 calculates a normal value RR3 of the DL_RSSI, which is obtained in the case where there is no interference and corresponds to a value P0 of the transmission power of the wireless terminal, which is received from the wireless terminal. The calculation is performed in accordance with the previously stored table or mathematical expression. Interference determining unit 37 calculates a difference ΔR3 between this normal value RR3 and a value R3 of the DL_RSSI received from the wireless terminal. In the case where difference ΔR3 is equal to or greater than a predetermined threshold value, interference determining unit 37 determines that there is a possibility that a downlink signal to be received by any wireless terminal in the zone of the wireless base station has interference with the pilot signal transmitted from the wireless base station.

Third Embodiment

An interference determining unit of a third embodiment is different from the interference determining unit of each of the first and second embodiments in terms of a method of determining whether or not there is interference.

(Operation)

FIG. 13 is a flowchart showing a procedure of an operation for control of transmission of the pilot signal and for control of switching of the communication level in the wireless base station of the third embodiment. The wireless base station performs the operation of the flowchart of FIG. 13 whenever a predetermined time elapses.

The flowchart of FIG. 13 is different from the flowchart of FIG. 9 in a step S310.

Specifically, when the wireless base station is not communicating with a wireless terminal (YES in step S100), interference determining unit 37 calculates a threshold value by subtracting a predetermined value from the DL_RSSI of the wireless base station. The DL_RSSI is received from the wireless terminal. When an adjacent base station's DL_RSSI received from the wireless terminal is equal to or greater than this threshold value (YES in a step S310), interference determining unit 37 determines that there is a possibility that a downlink signal to be received by any wireless terminal in the zone of the wireless base station has interference with the pilot signal transmitted from the wireless base station.

Fourth Embodiment

A pilot signal transmission control unit of a fourth embodiment is different from the pilot signal transmission control unit of the first embodiment in terms of a method of controlling transmission of the pilot signal in the case where it is determined that there is a possibility of interference.

(Operation)

FIG. 14 is a flowchart showing a procedure of an operation for control of transmission of the pilot signal and for control of switching of the communication level in the wireless base station of the fourth embodiment. The wireless base station performs the operation of the flowchart of FIG. 14 whenever a predetermined time elapses.

The flowchart of FIG. 14 is different from the flowchart of FIG. 9 in steps S402 and S407.

Specifically, when it is determined in step S101 or step S104 that there is a possibility that a downlink signal to be received by any wireless terminal in the zone of the wireless base station has interference with the pilot signal transmitted from the wireless base station, pilot signal transmission control unit 40 reduces power of the pilot signal in the whole of the user data area (to ½ of the power in the normal case, for example) (step S402).

When it is determined in step S106 or step S110 that there is a possibility that a downlink signal to be received by any wireless terminal in the zone of the wireless base station has interference with the pilot signal transmitted from the wireless base station, pilot signal transmission control unit 40 reduces power of the pilot signal in the area other than the area for the wireless terminal communicating therewith, in the whole of the user data area (to ½ of the power in the normal case, for example) (step S407).

Fifth Embodiment

A communication level switching unit of a fifth embodiment is different from the communication level switching unit of the first embodiment in terms of a method of switching the communication level when it is determined that there is a possibility of interference.

When it is determined that there is a possibility of interference, communication level switching unit 39 changes the switching table from the first switching table illustrated in the first embodiment to a second switching table. The second switching table is stored in switching table storage unit 38.

FIG. 15 shows a rule of switching the communication level in accordance with the second switching table.

The second switching table of FIG. 15 is different from the first switching table of FIG. 8 in terms of a condition under which the communication level is leveled up from "A7" to "B1".

Specifically, in FIG. 15, when the communication level at present is "A7" and packet error rate PER for the downlink signal is "0.5%" or smaller, the communication level is leveled up to "B1". The reference quality of "0.5" % or smaller in this second switching table is higher in communication quality than the reference quality of "1%" or smaller in the first switching table. In this case, communication level switching unit 39 changes the MCS from "64QAM ¾" to "QPSK ½", and changes the MIMO scheme from "MATRIX-A" to "MATRIX-B".

(Operation)

FIG. 16 is a flowchart showing a procedure of an operation for control of transmission of the pilot signal and for control of switching of the communication level in the wireless base station of the fifth embodiment. The wireless base station performs the operation of the flowchart of FIG. 16 whenever a predetermined time elapses.

The flowchart of FIG. 16 is different from the flowchart of FIG. 9 in steps 503, S509, and S512.

Specifically, when interference determining unit 37 determines in step S101, step S104, step S106, or step S110 that there is a possibility that the downlink signal to be received by any wireless terminal in the zone of the wireless base station has interference with the pilot signal transmitted from the wireless base station, communication level switching unit 39 switches the communication level using the second switching table based on packet error rate PER (step S503 and step S509).

Further, when interference determining unit 37 determines in step S101, step S104, step S106, or step S110 that there is no possibility that a downlink signal to be received by any wireless terminal in the zone of the wireless base station has interference with the pilot signal transmitted from the wireless base station, communication level switching unit 39 switches, as normally, the communication level using the first switching table based on packet error rate PER (step S512).

Sixth Embodiment

A pilot signal transmission control unit of a sixth embodiment is different from the pilot signal transmission control unit of the first embodiment in terms of a method of controlling transmission of the pilot signal when it is determined that there is a possibility of interference.

Figure 17:
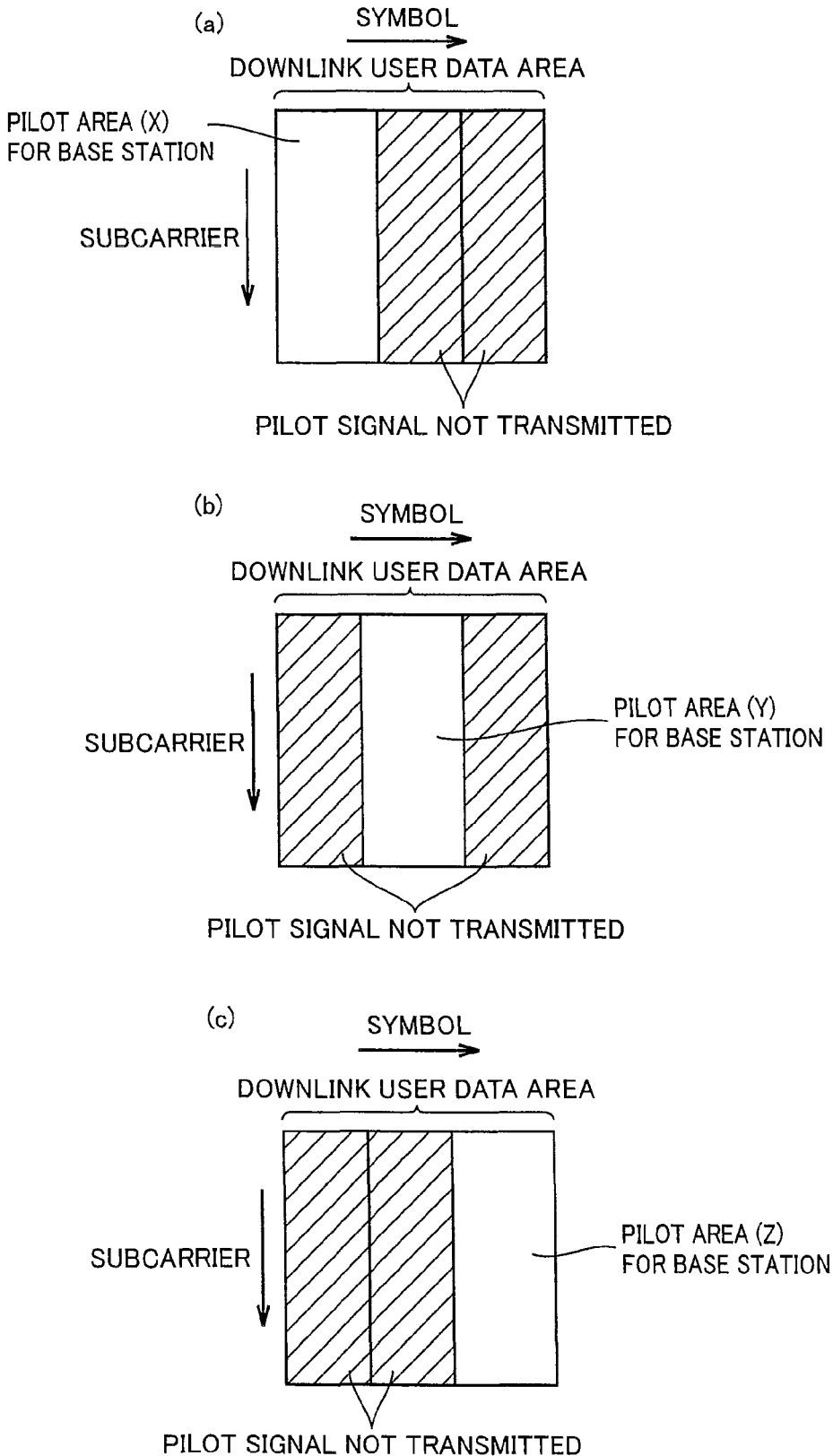

FIGS. 17(*a*)-(*c*) show respective exemplary pilot signal transmission areas set for and used for wireless base stations A, B, C. Each of FIGS. 17(*a*)-(*c*) shows a whole of downlink user data area. The horizontal axis represents symbols, whereas the vertical axis represents subcarriers.

As shown in FIG. 17(*a*), in wireless base station A, an area X is allocated to the pilot signal transmission area for wireless base station A. In wireless base station A, when interference determining unit 37 determines that there is a possibility that a downlink signal to be received by any wireless terminal in the zone of the wireless base station has interference with the pilot signal transmitted from the wireless base station, pilot signal transmission control unit 40 stops transmission of the pilot signal in the area other than area X in the whole of the user data area.

As shown in FIG. 17(*b*), in wireless base station B, an area Y is allocated to the pilot signal transmission area for wireless base station B. In wireless base station B, when interference determining unit 37 determines that there is a possibility that a downlink signal to be received by any wireless terminal in the zone of the wireless base station has interference with the pilot signal transmitted from the wireless base station, pilot signal transmission control unit 40 stops transmission of the pilot signal in the area other than area Y in the whole of the user data area.

As shown in FIG. 17(*c*), in wireless base station C, an area Z is allocated to the pilot signal transmission area for wireless base station C. In wireless base station C, when interference determining unit 37 determines that there is a possibility that a downlink signal to be received by any wireless terminal in the zone of the wireless base station has interference with the pilot signal transmitted from the wireless base station, pilot signal transmission control unit 40 stops transmission of the pilot signal in the area other than area Z in the whole of the user data area.

(Operation)

FIG. 18 is a flowchart showing a procedure of an operation for control of transmission of the pilot signal and for control of switching of the communication level in the wireless base station of the sixth embodiment. The wireless base station performs the operation of the flowchart of FIG. 18 whenever a predetermined time elapses.

The flowchart of FIG. 18 is different from the flowchart of FIG. 9 in a step S602.

When interference determining unit 37 determines in step S101 or step S104 that there is a possibility that the downlink signal to be received by any wireless terminal in the zone of the wireless base station has interference with the pilot signal transmitted from the wireless base station, pilot signal transmission control unit 40 stops the transmission of the pilot signal in the area other than the pilot signal transmission area for the wireless base station in the whole of the user data area (step S602).

(Variation)

The present invention is not limited to the embodiments described above and includes the following variation, for example.

(1) OFDM (Orthogonal Frequency Division Multiplexing)

In each of the embodiments of the present invention, the communication scheme in accordance with the OFDMA is illustratively employed, but the present invention is not limited to this. For example, an OFDM scheme may be employed.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: base station control center; 2: wireless base station; 3: network cable; 10, 11: antenna; 12: receiving unit; 13: transmitting unit; 14: MAC layer processing unit; 15, 20: RF unit; 16: CP removing unit; 17: FFT unit; 18, 23: subcarrier allocating unit; 21: CP adding unit; 22: IFFT unit; 24: multiantenna transmission signal processing unit; 25: demodulating unit; 26: decoding unit; 27: user data reception management unit; 32: modulating unit; 33: encoding unit; 34: user data transmission management unit; 35: communication quality management unit; 36: network communication unit; 37: interference determining unit; 38: switching table storage unit; 39: communication level switching unit; 40: pilot signal transmission control unit; 81: multiantenna reception signal processing unit; 82: first coupler/distributor; 83: second coupler/distributor.

The invention claimed is:

1. A wireless base station that communicates with a wireless terminal, the wireless base station comprising:
a determining unit configured to determine that there is a possibility that a downlink signal to be received by any wireless terminal has interference from a pilot signal transmitted from the wireless base station during a high-traffic time period; and a pilot signal transmission control unit configured to control the transmission of the pilot signal,
wherein when said determining unit determines that there is the possibility of interference, said pilot signal transmission control unit is configured to,
when the wireless base station is not communicating with any wireless terminal, stop the transmission of said pilot signal or reduce power of said pilot signal in a whole user data area of a downlink subframe, and,
when the wireless base station is communicating with at least one wireless terminal, stop the transmission of said pilot signal or reduce power of said pilot signal in a portion of a user data area of the downlink subframe in which user data is not being transmitted,
wherein the high-traffic time period is indicated by a high carrier to interference and noise ratio (CINR) of a downlink signal from an adjacent wireless base station.

2. A wireless base station that communicates with a wireless terminal, the wireless base station comprising:
a determining unit configured to determine that there is a possibility that a downlink signal to be received by any wireless terminal has interference from a pilot signal transmitted from the wireless base station, when a downlink signal transmitted from an adjacent wireless base station located adjacent to the wireless base station has interference; and
a pilot signal transmission control unit configured to control the transmission of the pilot signal,
wherein when said determining unit determines that there is the possibility of interference, said pilot signal transmission control unit is configured to,
when the wireless base station is not communicating with any wireless terminal, stop the transmission of said pilot signal or reduce power of said pilot signal in a whole user data area of a downlink subframe, and,
when the wireless base station is communicating with at least one wireless terminal, stop the transmission of said pilot signal or reduce power of said pilot signal in a portion of a user data area of the downlink subframe in which user data is not being transmitted.

3. A wireless base station that communicates with a wireless terminal, the wireless base station comprising:
a determining unit configured to determine whether or not there is a possibility that a downlink signal to be received by any wireless terminal has interference from a pilot signal transmitted from the wireless base station, based on strength or communication quality of the downlink signal from the wireless base station to the wireless terminal; and a pilot signal transmission control unit configured to control the transmission of the pilot signal,
wherein when said determining unit determines that there is the possibility of interference, said pilot signal transmission control unit is configured to,
when the wireless base station is not communicating with any wireless terminal, stop the transmission of said pilot signal or reduce power of said pilot signal in a whole user data area of a downlink subframe, and,
when the wireless base station is communicating with at least one wireless terminal, stop the transmission of said pilot signal or reduce power of said pilot signal in a portion of a user data area of the downlink subframe in which user data is not being transmitted.

4. A wireless communication system in which a wireless base station and a wireless terminal communicates with each other in accordance with an OFDMA scheme or an OFDM scheme and in which a plurality of wireless base stations are connected to a base station control center, each of the wireless base stations including: a determining unit configured to determine that there is a possibility that a downlink signal to be received by any wireless terminal has interference from a pilot signal transmitted from the wireless base station, when said base station control center notifies that a downlink signal transmitted from an adjacent wireless base station has interference; and
a pilot signal transmission control unit configured to control the transmission of the pilot signal, which is included in an OFDMA frame or an OFDM frame,
wherein, when said determining unit determines that there is the possibility of interference, said pilot signal transmission control unit is configured to,
when the wireless base station is not communicating with any wireless terminal, stop the transmission of said pilot signal or reduce power of said pilot signal in a whole user data area of a downlink subframe, and,
when the wireless base station is communicating with at least one wireless terminal, stop the transmission of said pilot signal or reduce power of said pilot signal in a portion of a user data area of the downlink subframe in which user data is not being transmitted,
wherein when the wireless base station notifies said base station control center of the interference, said base station control center is configured to notify the adjacent wireless base station of the interference.

5. A wireless communication system in which a wireless base station and a wireless terminal communicates with each other in accordance with an OFDMA scheme or an OFDM scheme, the wireless base station including:
a determining unit configured to determine whether or not there is a possibility that a downlink signal to be received by any wireless terminal has interference from a pilot signal transmitted from the wireless base station, based on strength or communication quality of the downlink signal transmitted from the wireless base station to the wireless terminal; and a pilot signal transmission control unit configured to control the transmission of the pilot signal, which is included in an OFDMA frame or an OFDM frame,
wherein, when said determining unit determines that there is the possibility of interference, said pilot signal transmission control unit is configured to,
when the wireless base station is not communicating with any wireless terminal, stop the transmission of said pilot signal or reduce power of said pilot signal in a whole user data area of a downlink subframe, and,
when the wireless base station is communicating with at least one wireless terminal, stop the transmission of said pilot signal or reduce power of said pilot signal in a portion of a user data area of the downlink subframe in which user data is not being transmitted,
wherein said wireless terminal is configured to transmit the strength or the communication quality of the downlink signal transmitted from the wireless base station, using an uplink subframe of the OFDMA frame or the OFDM frame.

6. A wireless communication method in a wireless communication system in which a wireless base station and a wireless terminal communicates with each other in accordance with an OFDMA scheme or an OFDM scheme and in which a plurality of wireless base stations are connected to a base station control center, the wireless communication method comprising the steps of:
any wireless base station determining whether or not a downlink signal transmitted from said any wireless base station to said wireless terminal has interference, based on strength or communication quality of the downlink signal transmitted from said any wireless base station to the wireless terminal;
said any wireless base station notifying said base station control center that the downlink signal has the interference, when it is determined that the downlink signal has the interference;
said base station control center notifying an adjacent wireless base station, which is located adjacent to said any wireless base station, that said downlink signal has the interference, when said any wireless base station notifies said base station control center that the downlink signal has the interference;
said adjacent wireless base station determining that there is a possibility that the downlink signal to be received by any wireless terminal has interference from a pilot signal transmitted from the adjacent wireless base station, when said base station control center notifies said adjacent wireless base station that the downlink signal transmitted from said any wireless base station located adjacent to the adjacent wireless base station has the interference; and
said adjacent wireless base station controlling the transmission of the pilot signal, which is included in an OFDMA frame or an OFDM frame,
wherein, when it is determined that there is the possibility of interference, the step of controlling includes a step of,
when the adjacent wireless base station is not communicating with any wireless terminal, stopping the transmission of said pilot signal or reducing power of said pilot signal in a whole user data area of a downlink subframe, and,
when the adjacent wireless base station is communicating with at least one wireless terminal, stopping the transmission of said pilot signal or reducing power of said pilot signal in a portion of a user data area of the downlink subframe in which user data is not being transmitted.

7. A wireless communication method in a wireless communication system in which a wireless base station and a wireless terminal communicate with each other in accordance with an OFDMA scheme or an OFDM scheme, the wireless communication method comprising the steps of:

said wireless terminal transmitting strength or communication quality of a downlink signal transmitted from the wireless base station, using an uplink subframe of an OFDMA frame or an OFDM frame;

the wireless base station determining whether or not there is a possibility that the downlink signal to be received by any wireless terminal has interference from a pilot signal transmitted from the wireless base station, based on the strength or the communication quality of the downlink signal transmitted from the wireless base station to the wireless terminal, the strength or the communication quality being received from said wireless terminal; and the wireless base station controlling the transmission of the pilot signal, which is included in the OFDMA frame or the OFDM frame, wherein, when it is determined that there is the possibility of interference, the step of controlling the transmission includes a step of, when the wireless base station is not communicating with any wireless terminal, stopping the transmission of said pilot signal or reducing power of said pilot signal in a whole user data area of a downlink, and, when the wireless base station is communicating with at least one wireless terminal, stopping the transmission of said pilot signal or reducing power of said pilot signal in a portion of a user data area of the downlink subframe in which user data is not being transmitted.

* * * * *